United States Patent [19]

Ishibashi et al.

[11] Patent Number: 4,730,297
[45] Date of Patent: Mar. 8, 1988

[54] RETARDATION COMPENSATING LIGHT BEAM GUIDING SYSTEM IN AN OPTICAL STORAGE MEDIUM DRIVE APPARATUS

[75] Inventors: Hiromichi Ishibashi, Toyonaka; Masaharu Imura, Moriguchi, both of Japan

[73] Assignee: Matsushita Electric Industrial Co., Ltd., Kadoma, Japan

[21] Appl. No.: 772,749

[22] Filed: Sep. 4, 1985

[30] Foreign Application Priority Data

Sep. 4, 1984 [JP] Japan .................................. 59-185505
Oct. 12, 1984 [JP] Japan .................................. 59-214542

[51] Int. Cl.⁴ .............................................. G11B 7/00
[52] U.S. Cl. ..................................... 369/110; 369/107; 369/112
[58] Field of Search ................... 358/342; 369/109, 13, 369/44, 45, 46, 107, 112, 110; 360/114; 250/201 DF; 346/76 L, 135.1; 356/5

[56] References Cited

U.S. PATENT DOCUMENTS 3,898,629 8/1975 Westerberg .......................... 340/173
4,005,935 2/1977 Wang ..................................... 356/5
4,310,910 1/1982 Sheng .............................. 369/109 X

FOREIGN PATENT DOCUMENTS 50-3507 4/1975 Japan .

Primary Examiner—Robert L. Richardson
Attorney, Agent, or Firm—Wenderoth, Lind & Ponack

[57] ABSTRACT

An optical storage medium drive apparatus having a light beam source for recording information on an optical storage medium and reading out the recorded information from the storage medium by using a light beam. The apparatus has an optical head in which the light source is included for emitting a light beam, and a light detector for converting reflected light from the storage medium into an electric signal and an optical system for guiding the light beam from the light source to the optical storage medium and a reflected light beam from the optical storage medium to the light detector. The optical system has therein a light reflector for changing the direction of the light beam and which causes retardation of the light. An optical phase compensator is disposed on the optical path between the optical head and the optical storage medium for compensating for retardation of the light beam caused by the reflector.

14 Claims, 15 Drawing Figures

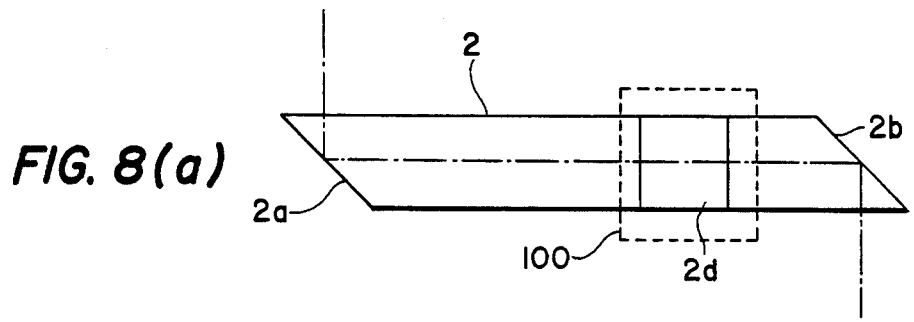
FIG. 8(a)
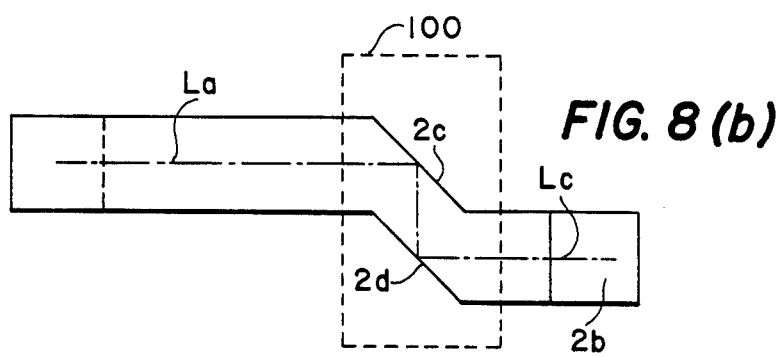
FIG. 8(b)
FIG. 9
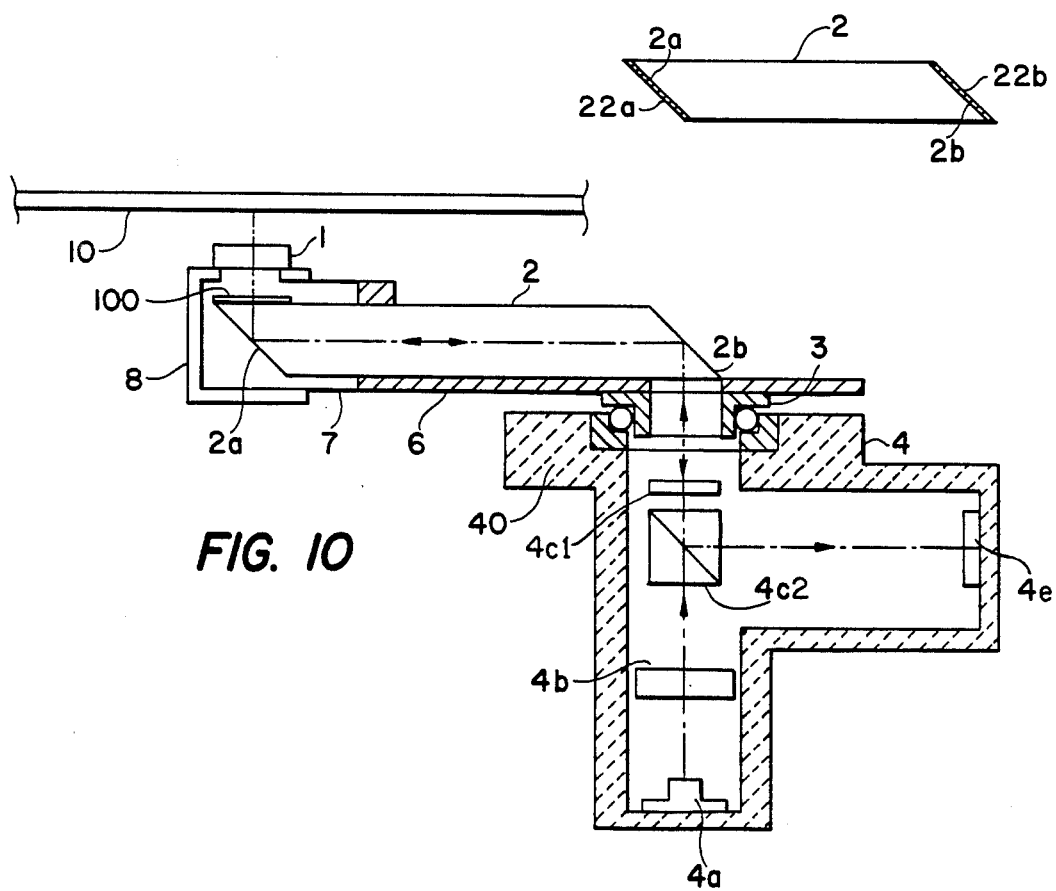
FIG. 10

RETARDATION COMPENSATING LIGHT BEAM GUIDING SYSTEM IN AN OPTICAL STORAGE MEDIUM DRIVE APPARATUS

BACKGROUND OF THE INVENTION

1. Field of the Invention

This invention relates to an optical storage medium drive apparatus for recording information on an optical storage medium and reading out the recorded information from the optical storage medium by using a light beam.

2. Description of the Prior Art

Optical information recording has been developed as a high density recording method. The optical storage medium is in the form of disk or card. The conventional optical storage medium drive apparatus has a light source such as a laser for emitting a light beam, an optical system for guiding the light beam, a focus lens for focusing the light beam on the surface of the storage medium, and a light detector for converting the light beam reflected from the surface of the storage medium into an electric signal.

In the recording mode, a modulated strong light beam is emitted from the light source and focused on the surface of the storage medium to change the physical state of the focused spots, thereby recording a information in the form of a dot pattern on the surface of the storage medium. The size of each dot is 1-2 $\mu$m, and thus a recording density of more than $4 \times 10^7$ bits/cm$^2$ can be obtained easily.

In the reading mode, a weak constant light beam is emitted from the light source and focused on the surface of the storage medium. A light beam reflected from the surface of the storage medium is modulated by the recorded dot. The reflected light beam is guided by the optical system to the light detector and converted by the light detector into an electric signal.

In the case of the magnetooptic storage medium, a information is recorded in the form of polarity variations of magnetic domains which are caused by being heated by the strong light beam. A linearly polarized light beam, when reflected from the surface of the storage medium, changes its polarizing angle according to the polarity of the magnetic domain on which the light beam is incident. This effect is known as the magnetooptic Kerr effect.

A conventional optical storage medium drive apparatus is disclosed in Japanese Laid-Open Patent Application No. 50-34507. The apparatus disclosed in this reference comprises a hollow arm support, a hollow arm turnable about a center axis of the hollow arm support, a scanning unit mounted in the hollow arm, and a light source unit mounted on a fixed member. An optical path between the light source unit and the optical storage disk is formed in the hollow arm support and the hollow arm.

Another conventional optical storage medium drive apparatus is disclosed in U.S. Pat. No. 3,898,629. This reference also shows a hollow shaft of a motor and a hollow arm having an optical system mounted therein.

Since the optical system for forming an optical path between the objective lens and the light source or the light detector contains some reflectors for changing the direction of the light beam, there occurs a problem of retardation, i.e. a phase delay of the light wave. In other words, the polarizing angle of the light beam changes when reflected by each of the reflectors, so that the linearly polarized light changes to an elliptically polarized light. Further, since the polarization of the light varies according to the rotation angle of the reflectors, the elliptical shape of the elliptically polarized light varies according to the tracking position of the light beam. The retardation of the reflected light causes a deterioration of the read-out information.

In the case of using the magnetooptic storage medium as described above, the effect of retardation is serious. This is because the data recorded on the storage medium are read in the form of small changes in polarization of the reflected light. The signal to noise ratio (S/N) of the read data is seriously deteriorated due to the retardation.

SUMMARY OF THE INVENTION

An object of the present invention is to provide a light beam guiding system in an optical storage medium drive apparatus which has a quick track access ability and is free from deterioration of S/N caused by retardation.

This object is accomplished by providing optical phase compensation means in the optical path of a light beam guiding system in an optical storage medium drive apparatus for compensating for the retardation.

A light beam guiding system in an optical storage medium drive apparatus according to the present invention comprises: an optical head having a light source for emitting a light beam and a light detector for converting an optical signal into an electric signal; an optical system for guiding the light beam from said light source to an optical storage medium and a reflected light beam from said optical storage medium to said light detector, said optical system having therein a light reflector for changing the direction of the light beam; and optical phase compensation means disposed on the optical path between said optical head and said optical storage medium for compensating for retardation of the light beam caused by said reflector.

The above and other objects, features and advantages of the present invention will become apparent from the following descripiton taken in conjunction with the accompanying drawings in which:

BRIEF DESCRIPTION OF THE DRAWINGS

FIGS. 8(a) and (b) are a side view and a top view, respectively, of an embodiment of a prism used in the present invention;

FIG. 9 is a side view of another embodiment of a prism used in the present invention; and FIG. 10 is a schematic side sectional view of a further embodiment of the present invention.

DESCRIPTION OF THE PREFERRED EMBODIMENTS

Figure 1:
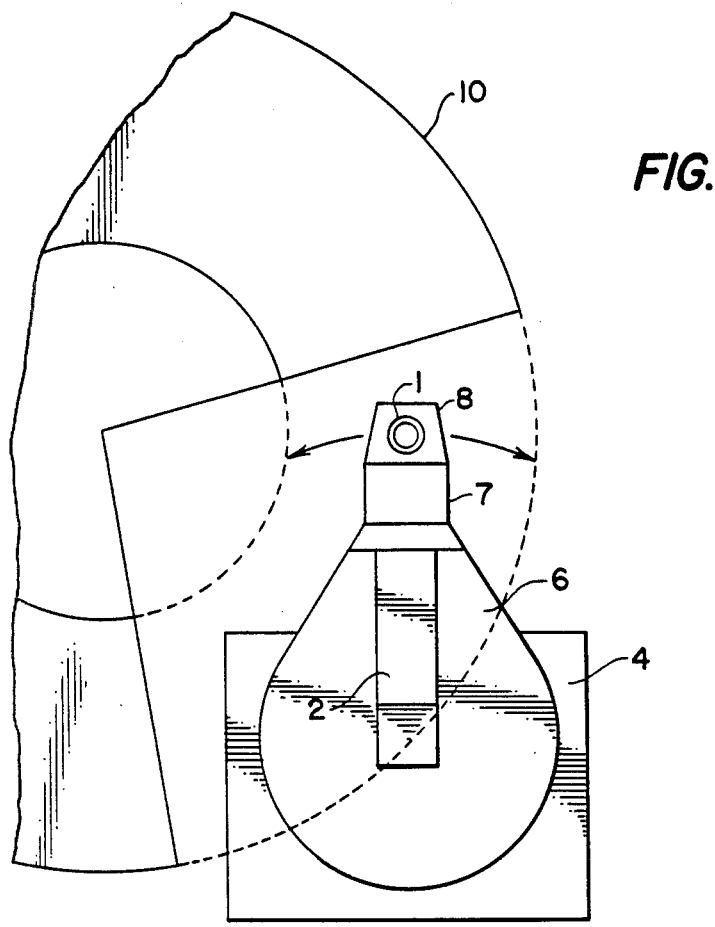
FIG. 1 is a schematic top view of an embodiment of a light beam guiding system an optical storage medium drive apparatus according to the invention.
Figure 2:
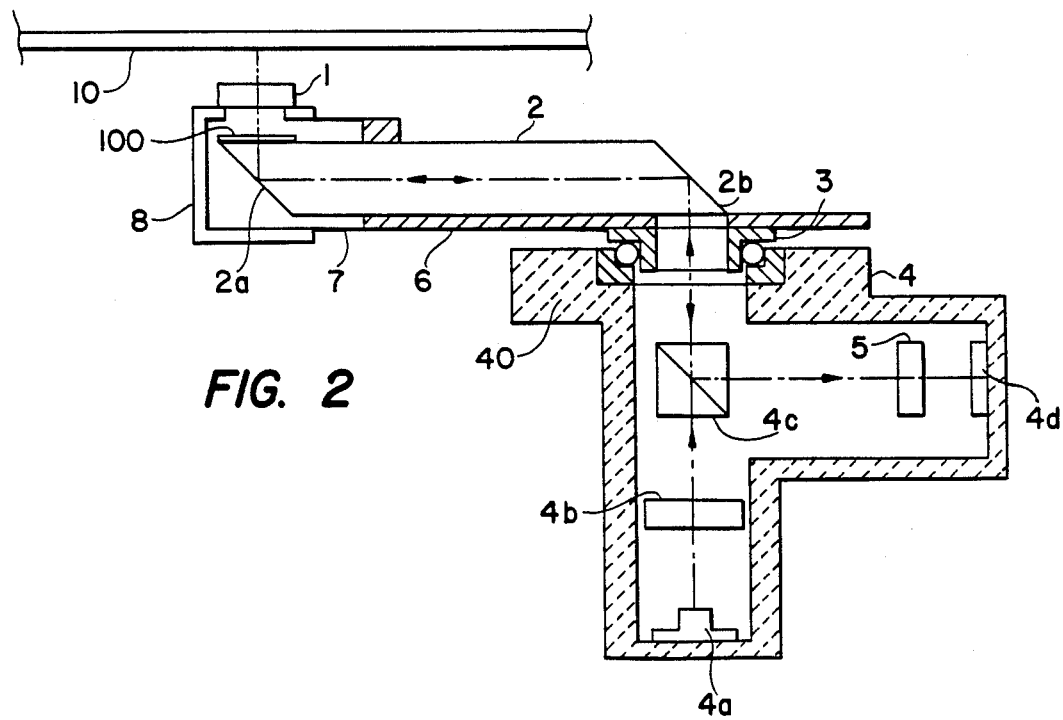
FIG. 2 is a schematic side sectional view of the embodiment shown in FIG. 1.

One embodiment of a light beam guiding system in an optical disc drive apparatus according to the invention using a magnetooptic storage disk is shown in FIGS. 1 and 2. A swing arm 6 is journaled in an optical head 4 by means of a bearing 3. A focus lens (objective lens) 1 is supported by a focus lens holder 8 which is suspension member by means of a suspender 7 mounted on a free end of the swing arm 6. The suspension member 7 is made resilient in the vertical direction so that the focus lens holder 8 is movable in the vertical direction for enabling focus adjustment of the focus lens 1. Means for moving the focus lens holder 8 is not shown in the figure because it is not directly related to the invention.

The optical head 4 comprises a light source 4a for emitting a light beam, a collimator lens 4b for changing the light beam to parallel rays, a beam splitter 4c for separating rays reflected from a storage disk 10 from the rays emitted from the light source 4a, a light detector 4d for detecting the reflected rays, and a frame 40 for mounting therein the above optical components 4a–4d. The optical head 4 further has a polarization analyzer 5 disposed on the optical path between the beam splitter 4c and the detector 4d for detecting the polarizing angle of the reflected rays.

A prism having a parallelogram-shaped longitudinal cross section, hereinafter parallelogram prism 2, is mounted on the swing arm 6 for forming an optical path between the optical head 4 and the focus lens 1. The two ends of the parallelogram prism 2 form a first reflector 2a and a second reflector 2b. Each of the reflectors 2a and 2b is a total reflection prism. The optical path in the optical head 4 from the light source 4a to the second reflector 2b is positioned on the turning axis of the swing arm 6. Means for turning the swing arm 6 is not shown in the figure because it is not directly related to the invention.

The reflecting surfaces of the reflectors 2a and 2b are positioned in parallel to each other and inclined by 45° relative to the turning axis of the swing arm 6. The light beam emitted from the light source 4a is guided along the optical path formed by the collimeter lens 4b, the beam splitter 4c, the second reflector 2b, the first reflector 2a, and the focus lens 1 to reach the surface of the disk 10, and the reflected light beam from the surface of the disk 10 is guided along the optical path formed by the focus lens 1, the first reflector 2a, the second reflector 4b, the beam splitter 4c, and the polarization analyzer 5 to reach the detector 4d.

An optical phase compensator 100 is provided on the surface of the parallelogram prism 2 facing the focus lens 1. The function of the optical phase compensator will be described below.

Figure 3A:
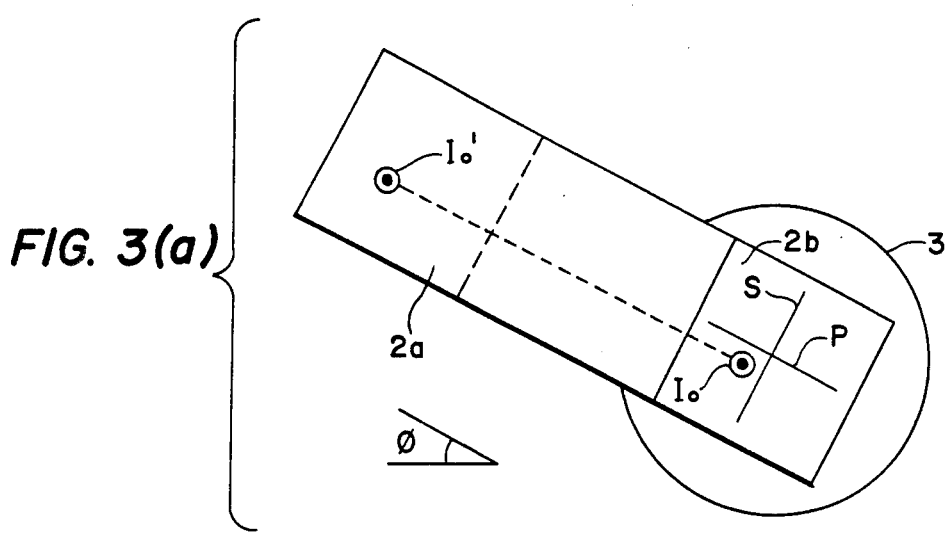
FIGS. 3(a)-3(c) and 4(a)-4(c) are diagrams showing polarization of light for explaining retardation.
Figure 3B:
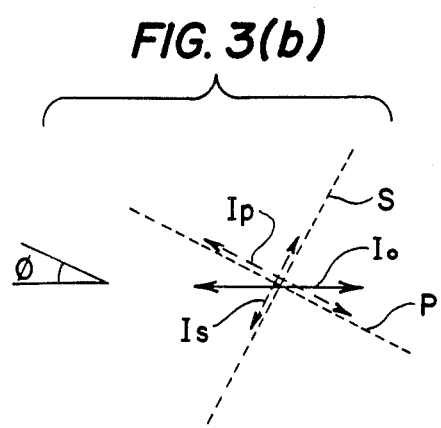
Figure 3C:
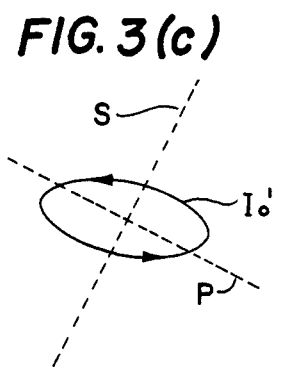

FIG. 3(a) shows a top view of the parallelogram prism 2 turned at an angle $\phi$ relative to the polarizing direction of a linearly polarized light $I_O$ from the optical head 4. A direction parallel to a line between the centers of the reflecting surfaces of the reflectors 2a and 2b (or the longitudinal direction of the swing arm 6) is defined as a P-axis, and a direction perpendicular to both the P-axis and the optical path from the optical head 4 to the second reflector 2b is defined as an S-axis. Referring to FIG. 3(b), the linearly polarized light $I_O$ can be divided into two components: a component $I_P$ in the direction of the P-axis and a component $I_S$ in the direction of the S-axis. The light $I_O$, after being reflected by the reflectors 2a and 2b, changes to an elliptically polarized light $I_O'$ as shown in FIG. 3(c) due to retardation caused at the reflectors 2a and 2b.

The linearly polarized light $I_O$ and its components $I_P$ and $I_S$ are expressed by the following formula:

$$\left. \begin{array}{l} I_O = a_O \cos wt \\ I_P = a_P \cos wt \\ I_S = a_S \cos wt \end{array} \right\} \quad (1)$$

$$\left. \begin{array}{l} a_P = a_O \cos \phi \\ a_S = a_O \sin \phi \end{array} \right\} \quad (2)$$

where $a_O$ is a coefficient representing the intensity of light.

When the light $I_O$ is reflected by a reflector, components $I_P'$ and $I_S'$ in the P- and S-axes directions of the reflected light becomes as follows:

$$\left. \begin{array}{l} I_P' = a_P \cos(wt - \delta_P) \\ I_S' = a_S \cos(wt - \delta_S) \end{array} \right\} \quad (3)$$

Here, $\delta_P$ and $\delta_S$ are phase differences in the P- and S-axes directions, respectively, due to retardation, and are expressed as follows:

$$\left. \begin{array}{l} \delta_P = \tan^{-1} \dfrac{2n \cos\theta \sqrt{n^2\sin^2\theta - 1}}{\cos^2\theta - n^4\sin^2\theta + n^2} \\ \delta_S = \tan^{-1} \dfrac{2n \cos\theta \sqrt{n^2\sin^2\theta - 1}}{n^2\cos^2\theta - n^2\sin^2\theta + 1} \end{array} \right\} \quad (4)$$

where $\theta$ is the incident angle of the light, and n is the refraction index of the parallelogram prism 2. The quantity of retardation $\delta$ is defined as:

$$\delta = \delta_P - \delta_S \quad (5)$$

From equations (3) and (5) is obtained the following equation:

$$a_S^2 I_P'^2 + a_P^2 I_S'^2 - 2 a_S a_P I_P' I_S' \cos \delta = a_P^2 a_S^2 \sin^2 \delta \quad (6)$$

Figure 4A:
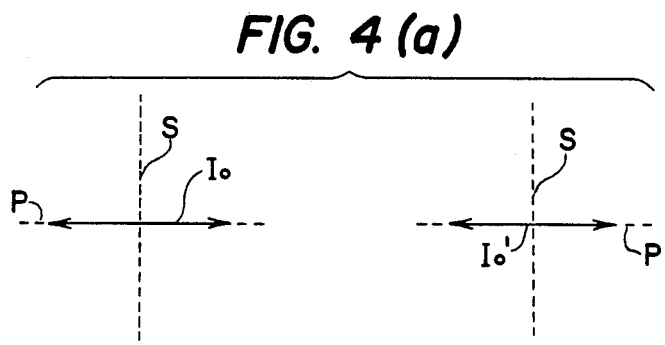
Figure 4B:
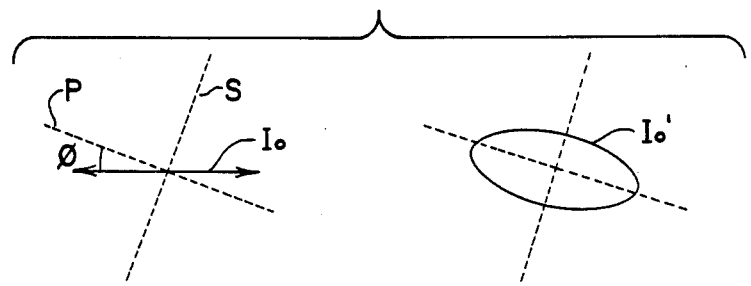
Figure 4C:
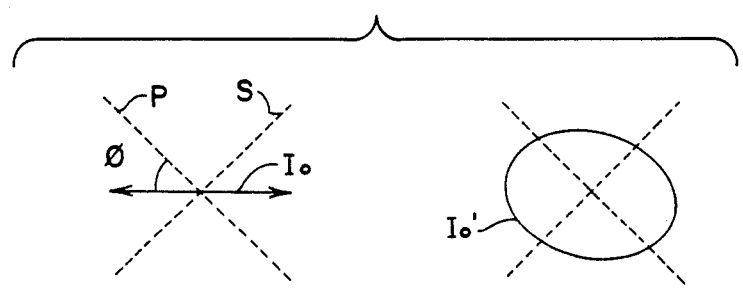

This equation is that for an ellipse with respect to variables $I_P'$ and $I_S'$. In other words, the reflected light $I_O'$ oscillates on an elliptical locus, or is elliptically polarized. The polarization or the shape of the ellipse of the elliptically polarized light $I_O'$ varies according the angle $\phi$ as shown in FIGS. 4(a)–4(c). This can be understood from equations (2) and (6).

The above described retardation effect is undesirable in an optical storage medium drive apparatus, especially in the one using a magnetooptic storage medium.

Figure 5:
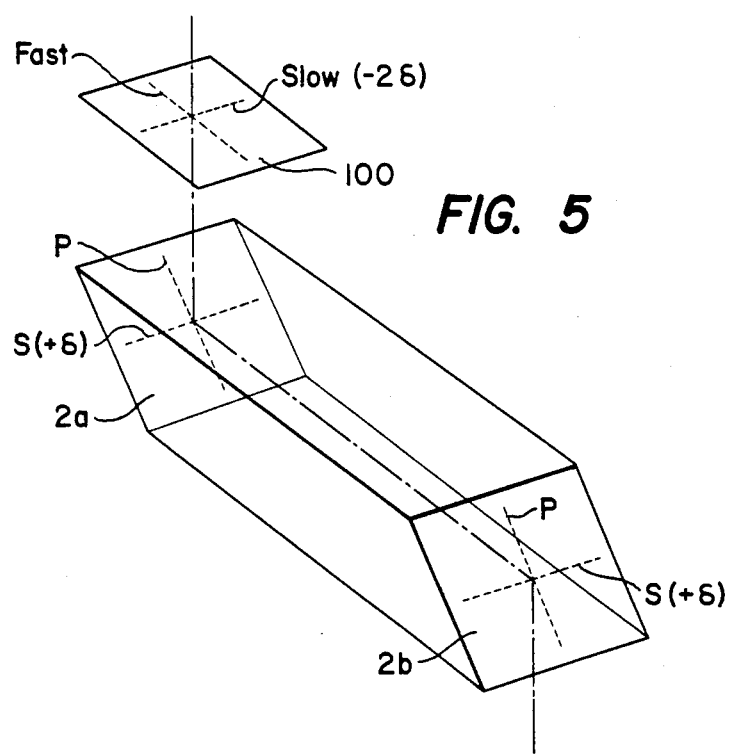
FIG. 5 is a perspective view of a parallelogram prism for explaining retardation.

The optical phase compensator 100 is used for cancelling this retardation. A so called wave plate such as a $\lambda/4$ plate or $\lambda/2$ plate can be used as the optical phase compensator ($\lambda$: wave length). The wave plate is a kind of phase shifter made of crystal and having a birefringence (or double refraction) property. That is, the wave plate has two axes perpendicular to each other: a fast axis and a slow axis as shown in FIG. 5. Optical phase velocities in the directions of the two axes are different from each other. The phase difference between the phases in the directions of the two axes can be properly selected by properly selecting the thickness of the plate. If a wave plate having the phase difference of $2\delta$ between the two axes is used as the optical phase compensator 100 and is so positioned that the fast axis is coincident with the P-axis and the slow axis is coincident with S-axis, then the phase difference caused by retardation at the reflectors 2a and 2b can be cancelled by the phase difference caused at the optical phase compensator 100. Therefore, the light beam after passing through the parallelogram prism 2 remains linearly polarized regardless of the rotational angle $\phi$ of the swing arm 6.

If the conditions of n=1.5 and $\theta=45°$ exist, the value of $2\delta$ becomes 77.2° or 0.21λ. In this case, a 0.2λ plate is desirable as the optical phase compensator 100.

Figure 6:
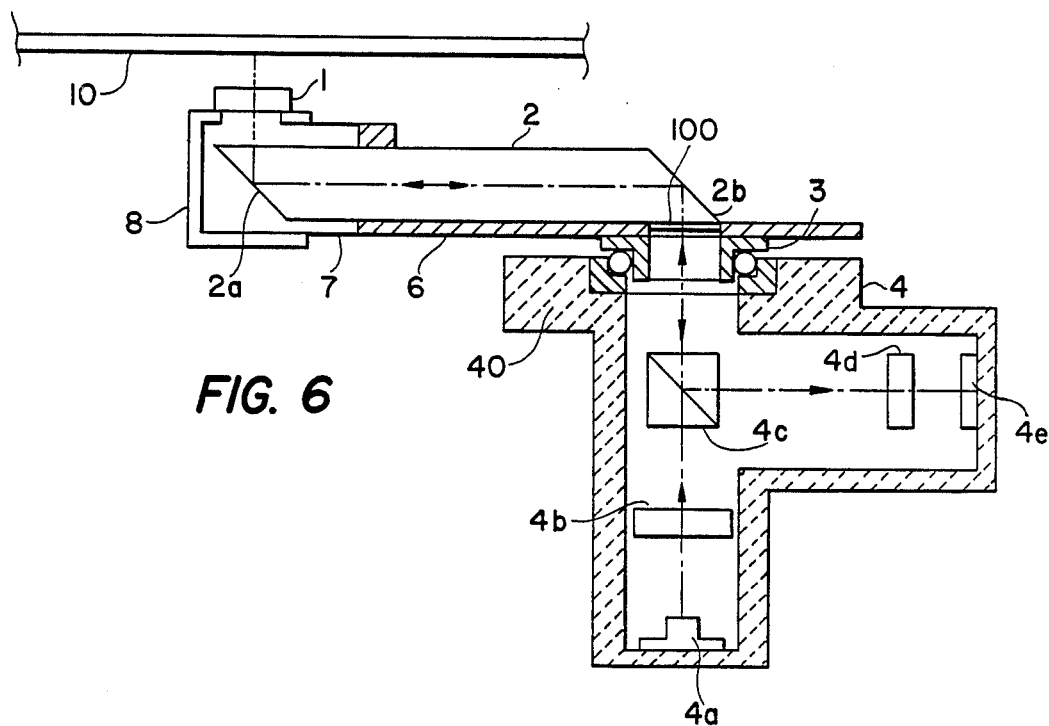
FIG. 6 is a schematic side sectional view of another embodiment of the present invention.
Figure 7:
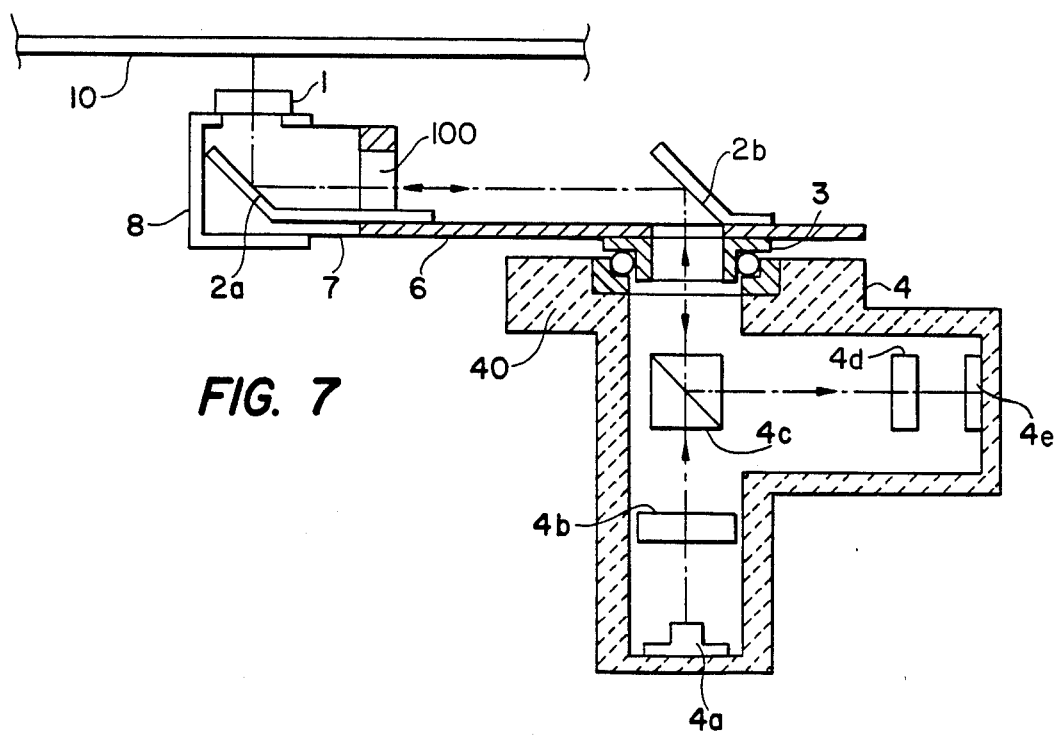
FIG. 7 is a schematic side sectional view of still another embodiment of the present invention.

In the embodiment shown in FIG. 2, the optical phase compensator 100 is placed on an incident surface of the parallelogram prism 2 facing the focus lens 1. However, the position of the optical phase compensator 100 may be anywhere on the optical path. FIG. 6 an embodiment in which the optical phase compensator 100 is placed on another incident surface of the parallelogram prism 2 facing the optical head 4. FIG. 7 shows an embodiment in which two mirrors are used as the two reflectors 2a and 2b instead of the parallelogram prism and the optical phase compensator 100 is placed between the two mirrors.

Another way to compensate for retardation is to use a prism as shown in FIG. 8 in place of the parallelogram prism. FIG. 8(a) is a side view of the prism and FIG. 8(b) is a top view of the same. The prism has four reflectors 2a, 2b, 2c and 2d. The reflector 2c is turned by 90° around the optical path $L_a$ relative to the reflector 2a, and the reflector 2d is turned by 90° around the optical path $L_c$ relative to the reflector 2b. The optical path $L_a$ is the optical path between the reflectors 2a and 2c, and the optical path $L_c$ is between the reflectors 2b and 2d. In this arrangement, the reflectors 2c and 2d function as an optical phase compensator. The reflector 2c compensates for retardation caused by the reflector 2a by generating the same quantity of retardation in the vertical direction, and the reflector 2d compensates for retardation caused by the reflector 2b in the same way.

A metallic reflector has smaller retardation than the prism reflector. So retardation can be reduced by putting a metallic thin film on the total reflection surface as shown in FIG. 9. Thin metallic films 22a and 22b are provided on the back surfaces of the reflectors 2a and 2b. This method is the simplest way to reduce retardation when reduction of the reflection efficiency is permissible.

This invention is applicable not only to the magnetooptic storage medium but also to other optical storage media such as a video disk or write-once type disk. A polarization analyzer is used if the apparatus is not for use with a magnetooptic storage medium. For example, as illustrated in FIG. 10, a polarization beam splitter (PBS) 4C1 is used with a λ/4 plate 4C2 for beam splitting. The PBS is a kind of polarization analyzer because it divides light beams according to the polarization. In FIG. 10, the λ/4 plate is used for changing the polarization of the rays coming from two directions: from the light source to the disk and from the disk to the detector. Also in this case, polarization should not change by means of the double reflector, and thus the optical phase compensator 100 is indispensable.

What is claimed is:

1. In an optical storage medium drive apparatus having a light beam source for providing a light beam for writing information on a storage medium and reading information recorded on said storage medium, a light beam guiding system comprising:
    an optical head in which the light beam source is provided for emitting a polarized light beam, said optical head having a light detector for converting a reflected light beam from the storage medium into an electric signal;
    an optical system provided between said optical head and said storage medium for forming an optical path along which said light beam emitted from the light source is guided from said optical head to said storage medium and said reflected light beam from said storage medium is guided to said optical head and in which optical system retardation of the light beam occurs; and
    optical phase compensation means disposed at a specific position in said optical path for shifting the phase of said light beam guided along said optical path so as to compensate for the retardation of said light beam.

2. A light beam guiding system according to claim 1, wherein said optical phase compensation means comprises a phase shifting plate made of an anisotropic crystal for passing said light beam therethrough.

3. A light beam guiding system according to claim 1, wherein said optical system comprises a total reflection prism, and said optical phase compensation means is placed on a surface of said total reflection prism on which light moving along said optical path is incident.

4. A light beam guiding system according to claim 1, further comprising an objective lens disposed between said optical system and said storage medium for focusing the light beam from said optical system onto said storage medium and guiding the reflected light beam from said storage medium to said optical system.

5. In an optical storage medium drive apparatus having a light beam source for providing a light beam for writing information on a storage medium and reading information recorded on said storage medium, a light beam guiding system comprising:
    an optical head in which the light beam source is provided for emitting a polarized light beam, said optical head having a light detector for converting a reflected light beam from the storage medium into an electric signal;
    an optical system having at least one reflective surface and forming a specific optical path along which said light beam emitted from said light source is guided from said optical head to said storage medium and said reflected light beam from said storage medium is guided to said optical head and in which optical system retardation of the light beam occurs;
    a swing arm turntable about an axis coincident with at least a part of said optical path and on which swing arm said optical system is mounted; and
    optical phase compensation means disposed at a specific position in said specific optical path between said optical head and said storage medium for shifting the phase of said light beam guided along said specific optical path so as to compensate for said retardation.

6. A light beam guiding system according to claim 5, wherein said optical phase compensation means comprises a phase shifting plate made of an anisotropic crystal for passing said light beam therethrough.

7. A light beam guiding system according to claim 5, wherein said optical system comprises a total reflection prism, and said optical phase compensation means is placed on a surface of said total reflection prism on which light moving along said optical path is incident.

8. A light beam guiding system according to claim 5, further comprising an objective lens mounted on said swing arm at a position between said optical system and said storage medium for focusing the light beam from said optical system onto said storage medium and guiding the reflected light beam from said storage medium to said optical system.

9. In an optical storage medium drive apparatus having a light beam source for providing a light beam for writing information on a storage medium and reading information recorded on said storage medium, a light beam guiding system comprising:

an optical head in which the light beam source is provided for emitting a polarized light beam, said optical head having a light detector for converting a reflected light beam from the storage medium into an electric signal;

an optical system for forming a specific optical path along which said light beam emitted from said light source is guided from said optical head to said storage medium and said reflected light beam from said storage medium is guided to said optical head and in which system retardation of the light beam occurs;

a swing arm turntable about an axis coincident with at least a part of said optical path and on which said optical system is mounted;

said optical system having a first reflector mounted on said swing arm at a position on said axis and having a reflective surface inclined by about 45° relative to said optical path from said optical head, and a second reflector mounted on said swing arm at a position near a free end of said swing arm and having a reflective surface inclined by about 45° relative to a part of said optical path extending in the longitudinal direction of said swing arm from said first reflector; and optical phase compensation means disposed at a specific position in said specific optical path between said optical head and said storage medium for shifting the phase of said light beam guided along said specific optical path so as to compensate for said retardation.

10. A light beam guiding system according to claim 9, wherein said optical phase compensation means comprises a phase shifting plate made of an anisotropic cyrstal for passing said light beam therethrough.

11. A light beam guiding system according to claim 9, wherein said optical phase compensation means is placed at a position between said first and second reflectors.

12. A light beam guiding system according to claim 9, wherein said optical system comprises a parallelogram prism having at opposite ends thereof two total reflective surfaces acting as said first and second reflectors.

13. A light beam guiding system according to claim 12, wherein said optical phase compensation means is placed on a surface of said prism on which light moving along said optical path is incident.

14. A light beam guiding system according to claim 9, further comprising an objective lens mounted on said swing arm at a position between said second reflector and said storage medium for focusing the light beam from said second reflector onto said storage medium and guiding the reflected light beam from said storage medium to said second reflector.

* * * * *